(12) United States Patent
Bilz

(10) Patent No.: US 10,442,017 B2
(45) Date of Patent: Oct. 15, 2019

(54) SUPPORT PEG HOLDER FOR A PIPE CUTTER

(71) Applicant: Sonja Maria Bilz, Nidderau (DE)

(72) Inventor: Sonja Maria Bilz, Nidderau (DE)

( * ) Notice: Subject to any disclaimer, the term of this patent is extended or adjusted under 35 U.S.C. 154(b) by 131 days.

(21) Appl. No.: 15/623,407

(22) Filed: Jun. 15, 2017

(65) Prior Publication Data
US 2017/0361385 A1 Dec. 21, 2017

(30) Foreign Application Priority Data
Jun. 16, 2016 (DE) .................. 10 2016 111 049

(51) Int. Cl.
*B23D 21/08* (2006.01)
(52) U.S. Cl.
CPC .................... *B23D 21/08* (2013.01)
(58) Field of Classification Search
CPC ....................................................... B23D 21/08
See application file for complete search history.

(56) References Cited

U.S. PATENT DOCUMENTS

| 3,315,355 A * | 4/1967 | Osburn ............... B23D 21/08 30/102 |
| 2008/0011133 A1* | 1/2008 | Karahalios ......... A61B 17/8863 83/13 |

FOREIGN PATENT DOCUMENTS

| DE | 7613538 | 9/1976 |
| DE | 202007004482 | 6/2007 |
| DE | 102014104474 | 10/2015 |
| EP | 1138425 A1 * | 10/2001 |

* cited by examiner

*Primary Examiner* — Stephen Choi
(74) *Attorney, Agent, or Firm* — Mark M. Friedman

(57) ABSTRACT

The invention refers to a mandrel holder for a pipe cutter having a nearly C-shaped bracket, which supports counter-pressure rollers on one end and is connected, at the other end, to a longitudinal handle containing an adjustment device carrying a cutting wheel, these components defining a tool plane through which a vertical axis passes, which extends between and axially parallel to the counter-pressure rollers and the cutting wheel. The tool plane contains the cutting point of the cutting wheel. The mandrel holder contains a coupling portion designed to radially and axially encompass an arc-shaped portion of the C-shaped bracket, an outer longitudinal portion extending from the coupling portion axially parallel to the vertical axis up to an end piece, and an inner longitudinal portion which extends from the end piece along the vertical axis back approximately to the tool plane and has a rotatable mandrel.

14 Claims, 3 Drawing Sheets

SUPPORT PEG HOLDER FOR A PIPE CUTTER

The invention refers to a support mandrel holder for a pipe cutter of the type having a nearly C-shaped bracket which supports counter-pressure rollers on one end and is connected at the other end to a longitudinal handle containing an adjustment unit which carries a cutting wheel, where these components define an imaginary tool plane through which an imaginary vertical axis extends between the counter-pressure rollers and the cutting wheel and axially parallel to them, a pipe to be cut extending along this vertical axis. The tool plane contains the cutting point of the cutting wheel.

A pipe cutter is a hand tool for cutting metal pipes which used for instance for the installation of water and heating facilities. It consists of a carrier which encompasses the pipe and on which a pair of supporting rollers and a cutting wheel opposite to them are arranged, where the distance between the supporting rollers and the cutting wheel can be adjusted by means of a threaded spindle.

For cutting a pipe, the same is inserted in the opened tool, and the cutting wheel is pressed against the pipe. If the pipe cutter is now turned radially about the pipe, a notch is produced which becomes deeper when the process is repeated after the cutting wheel has been readjusted until the pipe is cut through.

A pipe cutter of the type mentioned in Claim 1 is known, for instance, from DE 7613538 U.

If a thinner pipe is to be cut with such a pipe cutter, a suitable mandrel should be inserted for stabilization, creating also a squeezing effect between the mandrel and the cutting wheel. For preventing the mandrel from sliding out while wheel. For preventing the mandrel from sliding out while handling the pipe cutter, the mandrel could be fixed in some way, for instance with adhesive tape; but this would be a rather improvised solution.

DE 10 2014 104 474 A1 discloses a pipe cutter with an integrated mandrel which takes a position between the counter-pressure rollers and the cutting wheel by itself.

U.S. Pat. No. 2,821,781 A discloses a pipe cutter with a U-shaped bracket, one leg of which bears a cutting wheel and the other leg of which supports a rotatable mandrel which can be inserted in a pipe to be cut, for providing a cutting support on the level of the cutting wheel.

DE 20 2007 004 482 U1 discloses a cylindrical supporting body which can be inserted in a pipe for cutting support.

The invention has the task of providing a mandrel holder which is an accessory for an existing commercially available pipe cutter, which is practical and can be manufactured at low cost.

This task is achieved by a mandrel holder having the features indicated in Claim 1.

Advantageous further developments of the invention are set out in the dependent Claims.

According to the invention, the support peg holder contains a coupling portion adapted to encompass an arc-shaped portion of the C-shaped bracket of the pipe cutter radially and axially; an outer longitudinal portion extending axially parallel to the vertical axis from the coupling portion up to an end piece; and an inner longitudinal portion which extends from the end piece along the vertical axis back approximately to the tool plane, and which is adapted to rotatably support a mandrel at its free end, that is to bear, or to support a rotatable mandrel, for instance a mandrel with a stationary core and a jacket which is rotatable about the core.

For usage, the mandrel holder is placed on the pipe cutter with its coupling portion, the pipe cutter being open or being opened by moving the cutting wheel away from the counter-pressure rollers to a sufficient degree by means of the adjustment unit, which is normally a spindle. After this, a pipe to be cut is slid into the opening of the pipe cutter as far as desired and onto the mandrel and is then cut in the known manner. For this purpose, the pipe does not need to be clamped (which might cause it to be deformed or scratched); neither does the pipe cutter; instead, the pipe cutter can be operated by freehand, one hand holding the cutter and the other holding and rotating the pipe to be cut.

Also, it is not necessary to search for a suitable mandrel during work, and besides the mandrel holder forms a guide for the pipe which makes it possible to cut off even very short pieces of pipe or to shorten a pipe by a very small amount.

Although the inner longitudinal portion or at least the mandrel has to protrude into the opening of the pipe cutter, placement of the mandrel holder, if it is first positioned in a state which is rotated with respect to the pipe cutter, is achieved by making the mandrel pass the opening of the C-shaped bracket, while it is on the plane of the counter-pressure rollers and the cutting wheel, and by then rotating it such that the coupling portion slides over the arc-shaped portion of the C-shaped bracket. For this purpose, the angle over which the mounted coupling portion extends on the arc-shaped portion of the C-shaped bracket, is formed approximately as large as or smaller than the opening angle of the pipe cutter, that is, the angular distance between the ends of the C-shape.

For this reason, not only the coupling portion and the outer longitudinal portion, but also the inner longitudinal portion can consist of one single piece of material, in particular plastic, from which the mandrel holder can be manufactured at low cost by injection molding or small series production by means of 3D printing. The mandrel holder is subjected to little mechanical strain during use so that the hardness of common rigid plastics is sufficient, but it could also consist of a metal such as, for example, aluminum.

Alternatively, the inner longitudinal portion can be a separate part which is fastened to the end of the outer longitudinal portion e. g. by means of a screw or an integrated snap or bayonet joint. In this case, the end piece would be part of the outer longitudinal portion, but the end piece could alternatively be part of the inner longitudinal portion, and in this case, the inner longitudinal portion could be inserted in the outer longitudinal portion from the end of the outer longitudinal portion and could be fastened to the outer longitudinal portion by means of an integrated threaded, snap or bayonet joint.

Preferably, the coupling portion is designed to encompass with a positive engagement the arc-shaped portion of the C-shaped bracket. The coupling portion could also encompass the arc-shaped portion of the C-shaped bracket in both axial directions with a certain elastic frictional connection so that it clamps the bracket by itself; it is sufficient, however, if the coupling portion loosely fits the C-shaped bracket because the inner longitudinal portion or the mandrel, respectively, prevent the mandrel holder from falling off the pipe cutter after it has been attached to it.

Preferably, the two parts of the coupling portion which axially encompass the C-shaped bracket are limited radially inwardly by a circle segment whose radius corresponds to the outer diameter of the widest pipe which can be cut by a pipe cutter to which the mandrel holder is attached.

Preferably, the outer longitudinal portion has a cross-section which has approximately the shape of a circle segment, the inner radius of the circle segment corresponding to the outer diameter of the widest pipe which can be cut by a pipe cutter to which the mandrel holder is attached.

Preferably, the radii of the mentioned circle segments correspond to precisely half of the largest pipe diameter so that a pipe to be cut can be rested against the inner surfaces of the mandrel holder and is thus automatically aligned exactly vertically to the tool plane.

Of course, only pieces of pipe up to a certain length can be cut off a pipe with the mandrel holder. It is a feasible compromise if the outer longitudinal portion has a length approximately twice as large as the outer diameter of the widest pipe which can be cut by a pipe cutter to which the mandrel holder is attached.

For saving material, the inner longitudinal portion can have a star-shaped cross-section, preferably with three braces or "beams" of equal length, where however more braces, for instance four or five, can be present as well. The outer ends of the braces in the radial direction are positioned at equal distances in an imaginary hollow cylinder whose outer diameter is smaller than the inner diameter of the narrowest pipe which can be cut by a pipe cutter to which the mandrel holder is attached. Alternatively, the inner longitudinal portion could also be a solid cylinder or a hollow cylinder with a corresponding outer diameter.

Preferably, the inner longitudinal portion has an end portion which extends beyond the tool plane and on which the braces are in part radially shortened, the end portion being formed, at an outermost end thereof axially and radially, as barbs. The partial radial shortening of the braces is dimensioned such that an annular mandrel in the form of a short piece of pipe can be axially slid onto the end portion and rotate there freely, with the barbs first yielding resiliently and then, by springing back, preventing the mandrel from being detached from the end portion during use.

In an alternative embodiment, the inner longitudinal portion does not extend beyond the tool plane but ends before, for instance approximately where the coupling portion transitions to the outer longitudinal portion. In this case, the mandrel would not be a piece of pipe which rotates directly on the inner longitudinal portion but, for instance, a cylindrical piece loosely screwed to the end of the inner longitudinal portion so that it can rotate, or a piece rotatable on a base screwed to the free end of the inner longitudinal portion. It is also possible to provide a ball bearing for easy rotation.

In a further development, the outer longitudinal portion can be provided with a scale, for instance with formed or printed millimeter and centimeter lines so that the user immediately sees how far he has inserted a pipe and how much he would cut off of it in this position.

The pipe cutter according to the invention is especially suited for cutting relatively thin-walled pipes with wall thicknesses of less than one millimeter and inner diameters of 30, 35 or 40 millimeters.

Some examples of embodiment will now be described by means of the Figures wherein FIG. 1 shows different views of a mandrel holder for a pipe cutter;

FIG. 2 shows the mandrel holder of FIG. 1 in a state in which it is mounted to a commercially available pipe cutter: top right, in a perspective view, bottom left, in a front view of an end piece, and bottom right, in a lateral view.

Figure 2:
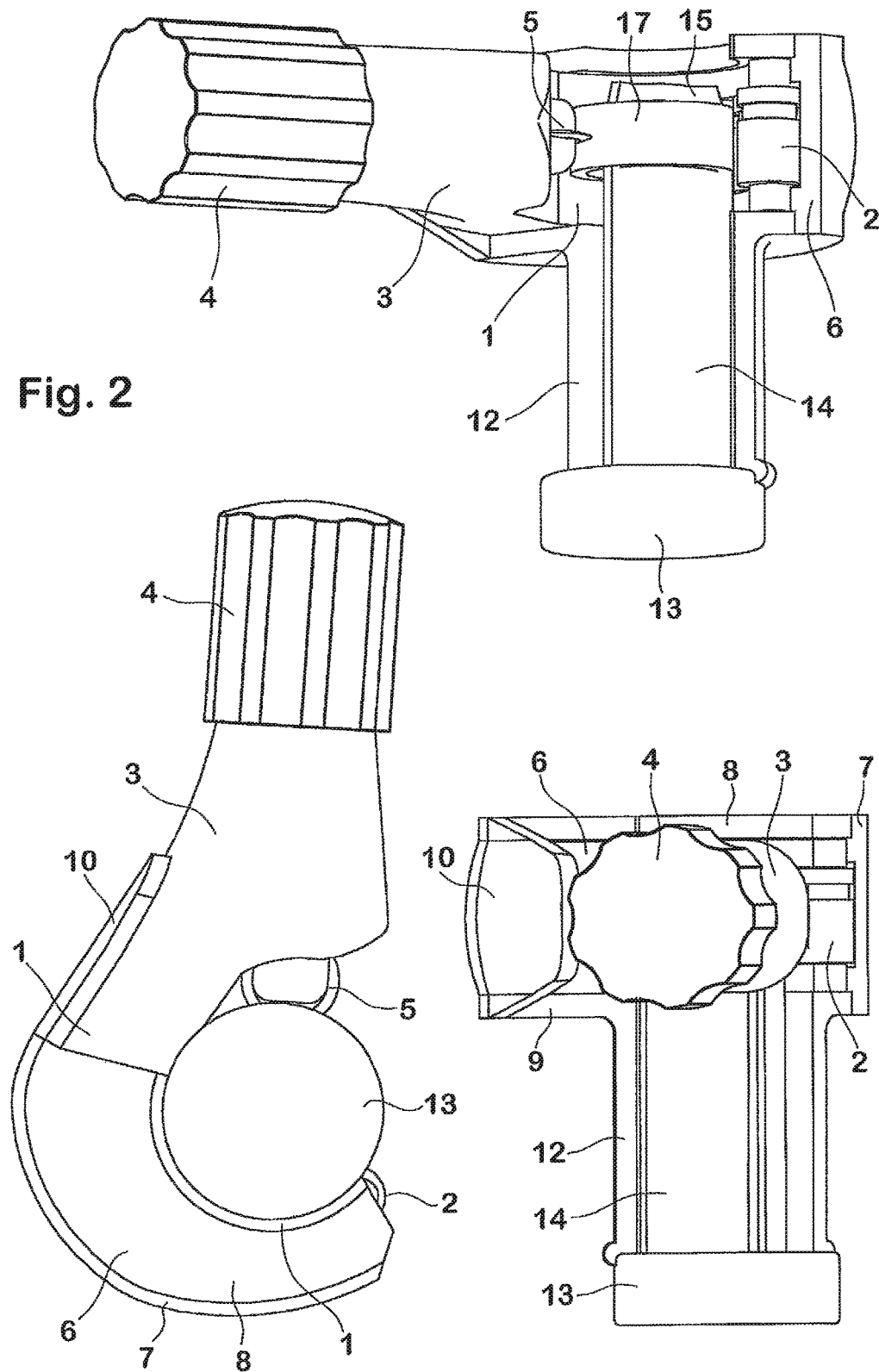
FIG. 2 shows different views of the mandrel holder in FIG. 1, mounted to a pipe cutter.

As can be seen in FIG. 2, the pipe cutter contains a nearly C-shaped bracket 1 (partly concealed by the mandrel holder) which on one end supports several counter-pressure rollers 2 and transitions to a longitudinal handle 3 on the other end, on which handle there is a turning knob 4 by means of which a cutting wheel 5 is moved towards or away from the counter-pressure rollers 2 via an interior threaded spindle.

The C-shaped bracket 1 and the other parts of the pipe cutter, which are mentioned above, extend on an imaginary plane termed here "tool plane", intersected by an imaginary axis perpendicular thereto, which extends somewhere between the counter-pressure rollers 2 and the cutting wheel 5 and parallel to the rotational axes thereof.

Figure 1:
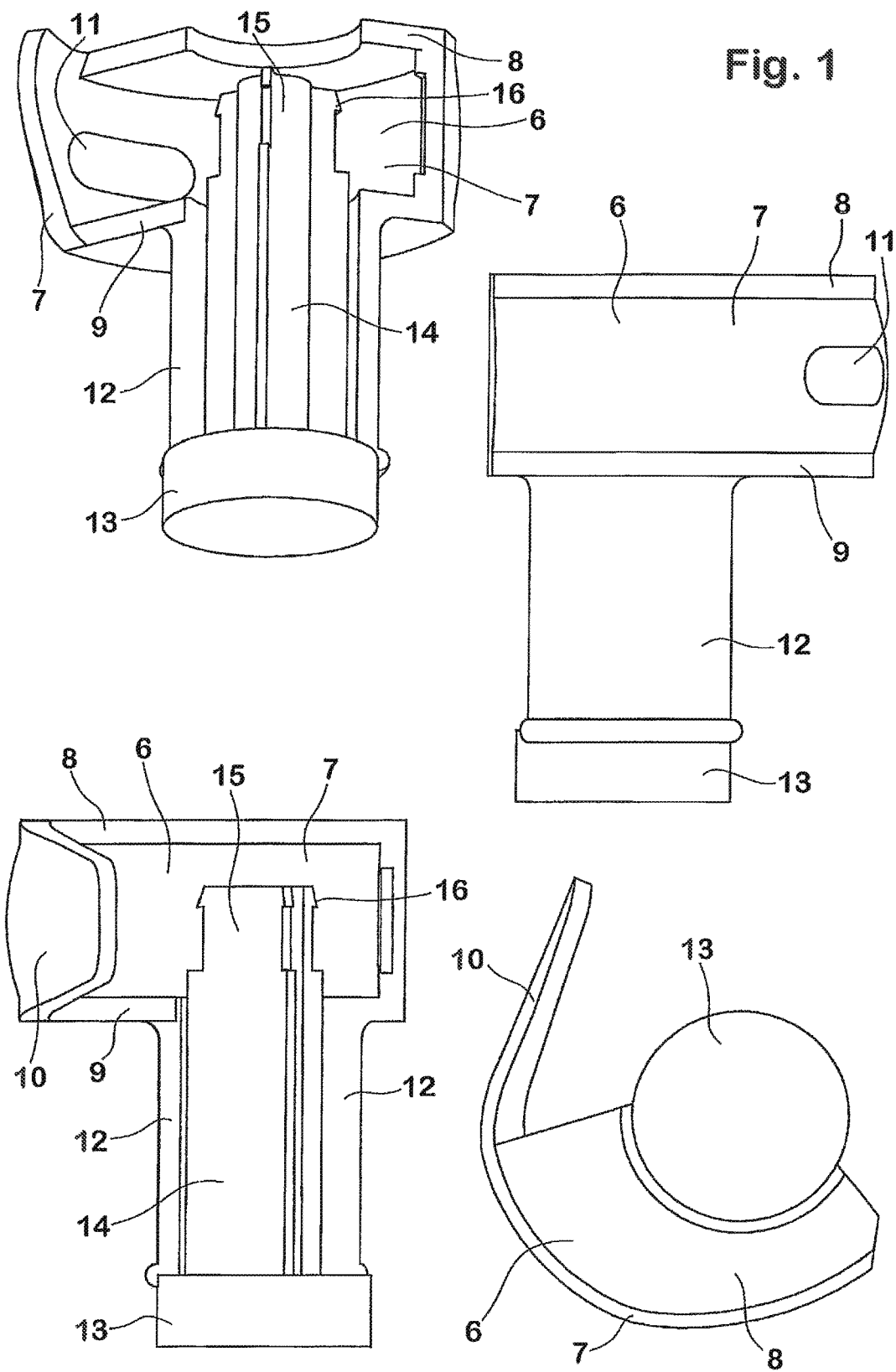
FIG. 1 shows a first example of embodiment for a mandrel holder: top left, in a perspective view, top right, in a lateral view, bottom left, in a partial cross-section and bottom right, in a front view of an end piece, an extension of the mandrel holder being cut off in both top views for purposes of presentation.

As can be seen in FIGS. 1 and 2, the mandrel holder contains a coupling portion 6 which is designed to encompass with positive engagement an arc-shaped portion of the C-shaped bracket 1 of the pipe cutter radially and axially; that is, the coupling portion 6 is a shell-shaped part with an inner surface adapted to the outer surface of the C-shaped bracket 1.

The coupling portion 6 contains a radial bent portion 7 which is bent in two dimensions similarly to a portion of a barrel, and two axial portions 8 and 9, each of which having the shape of an angular section of a disk.

The radial bent portion 7 also has a more or less straight tangential extension 10 which is only shown in its entirety in the two lower views and by means of which the mandrel holder can be supported on the back of the pipe cutter, namely at a straight transition from the arc-shaped portion of the C-shaped bracket 1 to the handle 3.

The radial bent portion 7 also contains a cutout 11 which can be optionally provided if the pipe cutter has an integrated pipe trimming machine which can be pushed out in a telescope-like manner from its back so that the pipe trimming machine can also be used with the mandrel holder in the mounted position.

An outer longitudinal portion 12 with a cross-section in the form of a circle segment is formed on one axial portion 9 of the coupling portion 6, the outer longitudinal portion extending from the coupling portion 6 axially parallel to the vertical axis mentioned above up to an end piece 13.

From the end piece 13, along the vertical axis back to the coupling portion 6 and slightly beyond the tool plane, an inner longitudinal portion 14 extends which has a star-shaped cross-section with three braces or "beams" of equal length, whose radially outermost ends are located at equal distances in an imaginary hollow cylinder whose outer diameter is smaller than the inner diameter of the narrowest pipe which can be cut with the pipe cutter by means of the mandrel holder.

The inner longitudinal portion 14 has an end portion 15 which extends between the counter-pressure rollers 2 and the cutting wheel 5 when the mandrel holder is attached to the pipe cutter. In the region of the end portion 15, the braces of the inner longitudinal portion 14 are in part radially shortened and are formed, at their axially and radially outermost ends, like barbs 16.

The mandrel holder preferably consists of plastic, and because of its material characteristics, the barbs 16 make it possible to slide a mandrel 17, in the form of a short piece of pipe, shown only in the top part of FIG. 2, made of stainless steel, onto the end portion 15, after which the barbs 16 spring back and retain the mandrel 17 on the end portion 15. The mandrel 17 and the partly radially shortened braces in the end portion 15 are dimensioned such that the mandrel 17 can then freely rotate on the end portion 15.

Figure 3:
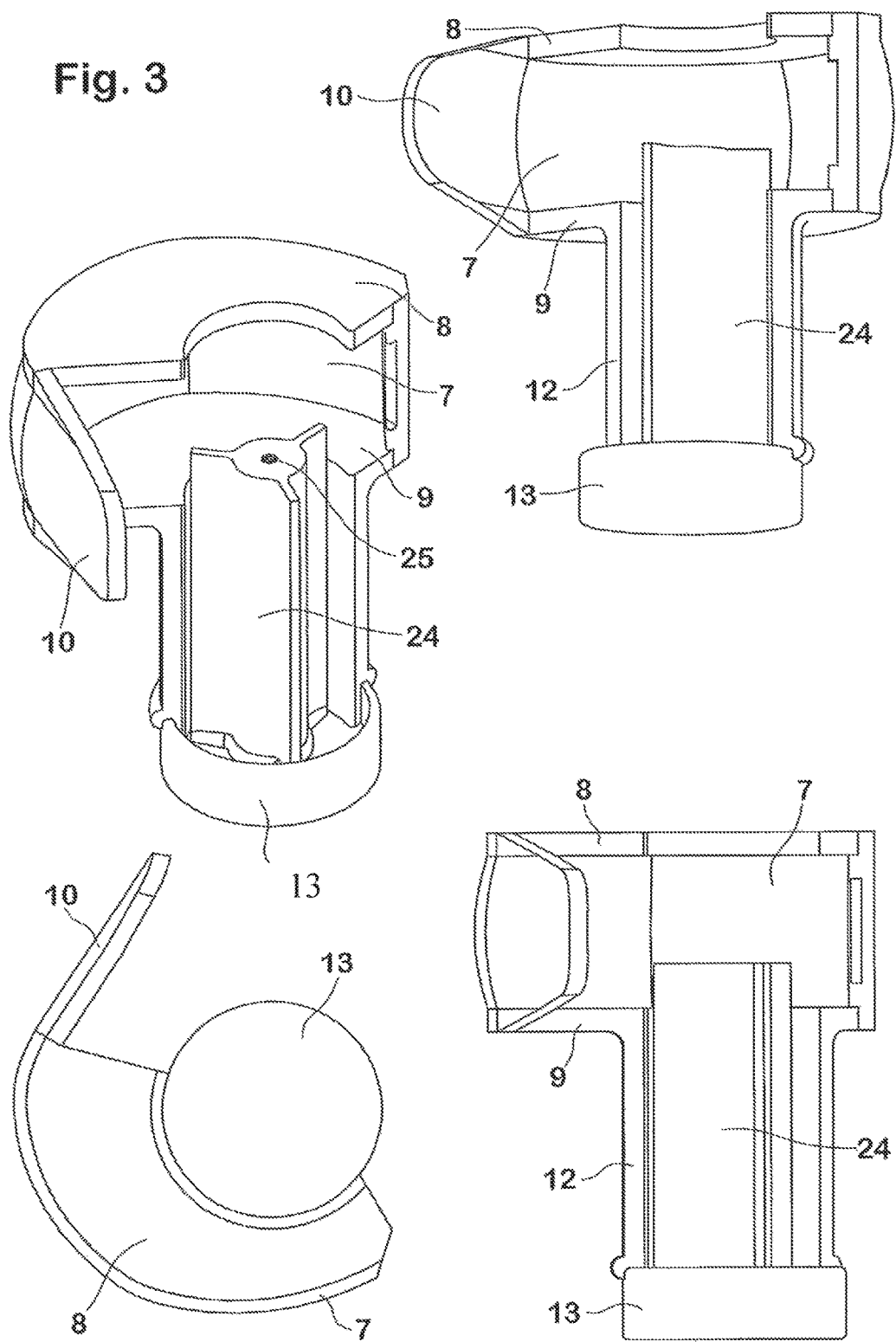
FIG. 3 shows views of a variant of the mandrel holder in FIGS. 1 and 2.

FIG. 3 shows a variant of the mandrel holder in FIGS. 1 and 2: namely perspective views on the top left and right, a front view of an end piece on the bottom left and in partial cross-section on the bottom right.

The mandrel holder shown in FIG. 3 substantially differs from the one shown in FIGS. 1 and 2 only by having, instead of the inner longitudinal portion 14, an inner longitudinal portion 24 lacking the final portion 15, containing, in its free end, a central bore 25 into which a screw can be threaded by means of which a suitable mandrel (not shown) can be screwed to the axial end of the inner longitudinal portion 24 so that the mandrel is on the tool plane and can rotate there freely if it cannot rotate in itself.

The invention claimed is:

1. A mandrel holder adapted for coupling to a pipe cutter having a C-shaped bracket with an arc shaped portion, the C-shaped bracket supporting counter-pressure rollers on one end and being connected at the other end to a longitudinal handle containing an adjustment unit carrying a cutting wheel, wherein the counter-pressure rollers and the cutting wheel define a tool plane with a vertical axis passing through and extending between and axially parallel to the counter-pressure rollers and the cutting wheel, the tool plane containing the cutting point of the cutting wheel, the mandrel holder comprising:
 a) a coupling portion adapted to radially and axially encompass the arc-shaped portion of the C-shaped bracket;
 b) an outer longitudinal portion extending from the coupling portion axially parallel to the vertical axis up to an end piece; and
 c) an inner longitudinal portion extending from the end piece along the vertical axis back towards the tool plane and being adapted to rotatably support a mandrel or to support a rotatable mandrel.

2. The mandrel holder according to claim 1, wherein at least the coupling portion and the outer longitudinal portion consist of one piece of material.

3. The mandrel holder according to claim 2, wherein the one piece of material is plastic.

4. The mandrel holder according to claim 1, wherein the coupling portion is designed to encompass, with positive engagement, the arc-shaped portion of the C-shaped bracket.

5. The mandrel holder according to claim 1, wherein the coupling portion axially encompassing the C-shaped bracket is in a direction radially inwardly limited by a circle segment with a predefined radius adapted to a corresponding outer diameter of a widest pipe cuttable with the pipe cutter.

6. The mandrel holder according to claim 1, wherein the outer longitudinal portion has a cross-section which has the shape of the circle segment, the inner radius of the circle segment adapted to correspond to the outer diameter of the widest pipe cuttable with the pipe cutter.

7. The mandrel holder according to claim 1, wherein the outer longitudinal portion has a length twice as large as the outer diameter of the widest pipe cuttable with the pipe cutter.

8. The mandrel holder according to claim 1, wherein the inner longitudinal portion has a recess adapted to rotatably support a mandrel consisting of a short piece of pipe.

9. The mandrel holder according to claim 1, wherein the inner longitudinal portion has one free end being adapted to rotatably support a mandrel such that the mandrel is located on the tool plane and freely rotatable thereon.

10. The mandrel holder according to claim 1, wherein the inner longitudinal portion has a star-shaped cross-section with radially outwardly extending braces of equal length, the radially outermost ends of the braces being positioned at equal distances in an imaginary hollow cylinder having an outer diameter smaller than an inner diameter of a narrowest pipe cuttable with the pipe cutter.

11. The mandrel holder according to claim 10, wherein the inner longitudinal portion has a final portion extending beyond the tool plane on which the braces are partially radially shortened and formed like barbs at axially and radially outermost ends of the braces.

12. The mandrel holder according to claim 10, wherein the star-shaped cross-section of the inner longitudinal portion has three braces of equal length.

13. The mandrel holder according to claim 1, wherein at least the coupling portion, the outer longitudinal portion and the inner longitudinal portion consist of one piece of material.

14. The mandrel holder according to claim 13, wherein the one piece of material is plastic.

* * * * *